W. R. WILSON.
WHEEL CONSTRUCTION.
APPLICATION FILED FEB. 8, 1919.

1,328,067.

Patented Jan. 13, 1920.
2 SHEETS—SHEET 1.

INVENTOR.
WILLIAM R. WILSON.
BY
Lockwood & Lockwood
ATTORNEYS

W. R. WILSON.
WHEEL CONSTRUCTION.
APPLICATION FILED FEB. 8, 1919.
1,328,067.
Patented Jan. 13, 1920.
2 SHEETS—SHEET 2.
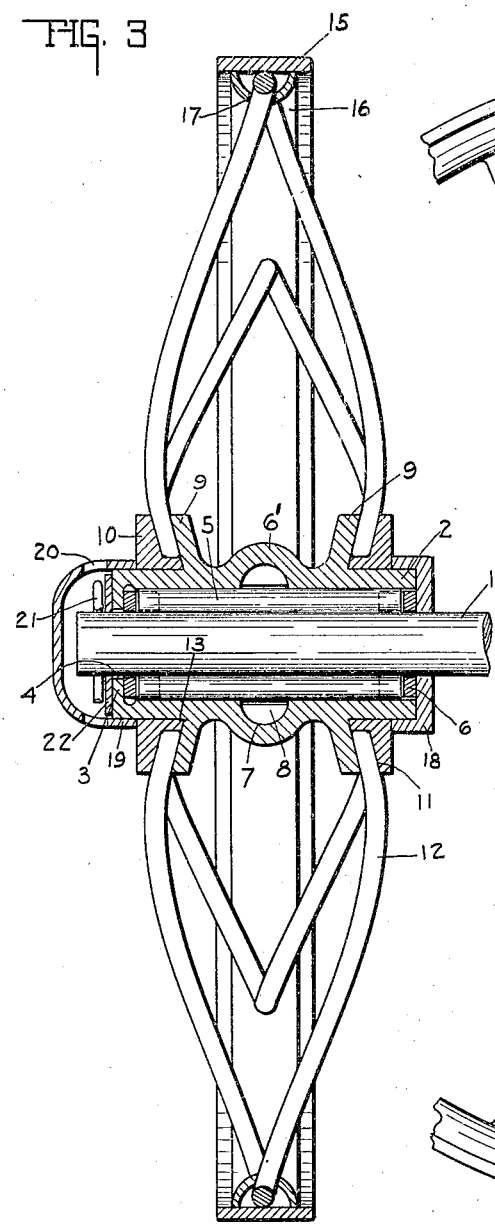
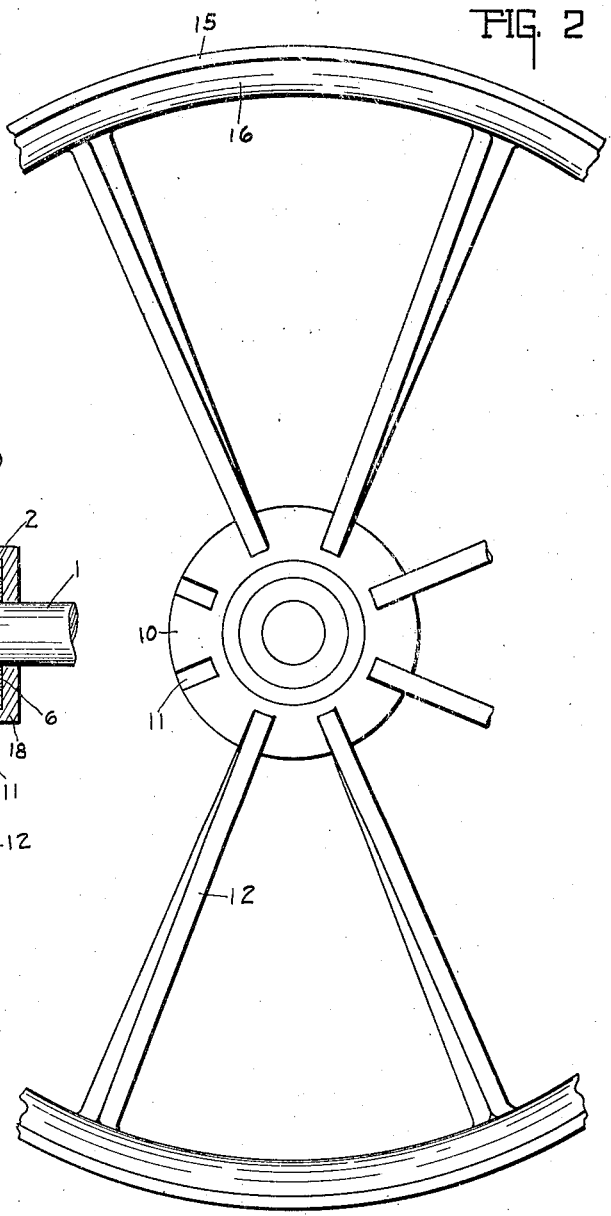
INVENTOR.
WILLIAM R. WILSON.
BY
Lockwood & Lockwood
ATTORNEYS

UNITED STATES PATENT OFFICE.

WILLIAM R. WILSON, OF TERRE HAUTE, INDIANA.

WHEEL CONSTRUCTION.

1,328,067. Specification of Letters Patent. Patented Jan. 13, 1920.

Application filed February 8, 1919. Serial No. 275,796.

*To all whom it may concern:*

Be it known that I, WILLIAM R. WILSON, a citizen of the United States, and a resident of Terre Haute, county of Vigo, and State of Indiana, have invented a certain new and useful Wheel Construction; and I do hereby declare that the following is a full, clear, and exact description thereof, reference being had to the accompanying drawings, in which like numerals refer to like parts.

This invention relates to new and useful improvements in wheel construction, and more particularly to that class to be used in connection with coaster wagons, baby carriages, wheel-barrows and the like, although the same may be used in connection with larger vehicles if so desired.

The prime feature of the invention is in so constructing the parts that they can be made entirely of metal and readily and quickly assembled.

A further feature of the invention is in so constructing the spokes that parts thereof will be interlocked or covered over by a channel shaped felly and anchored between the felly and the tire or rim of the wheel.

A further feature of the invention is in constructing each spoke substantially U-shaped, the arms of which are separated and engaged with flanges adjacent the opposite ends of the hub, the end portions of the spoke, resting against the rim or tire of the wheel, being connected, said connecting portion being inclosed by the substantially channel shaped felly.

A further feature of the invention is in so attaching the inner ends of the spokes to the hub that they will be given more or less tension so as to resist side thrusts and blows delivered to the tire.

A further feature of the invention is the provision of means for locking the spokes in engagement with the hub.

A further feature of the invention is the provision of a hub arranged to receive bearing rollers, and also provided with a lubricant containing channel so that the bearing rollers will be properly lubricated as the wheel is rotated.

A further feature of the invention is the provision of caps for giving a finished effect to the ends of the hub, and for preventing dirt and the like from entering the hub.

Other objects and advantages will be hereinafter more fully set forth and pointed out in the accompanying specification.

Figure 1:
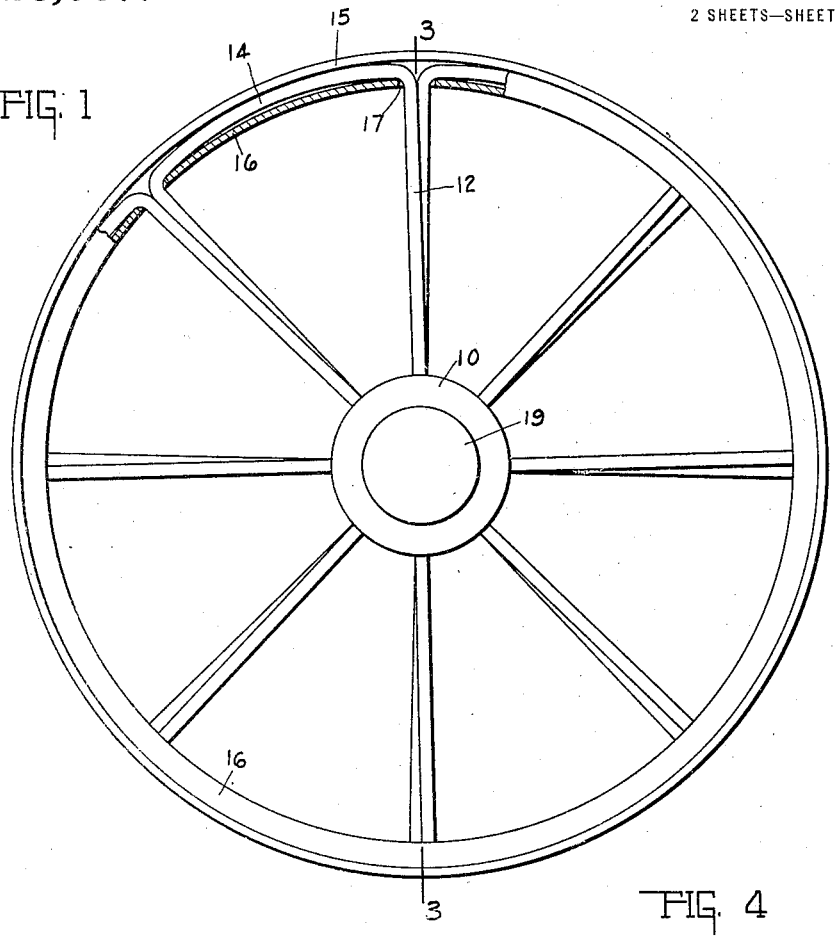
Figure 4:
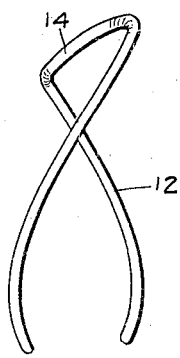
Figure 5:
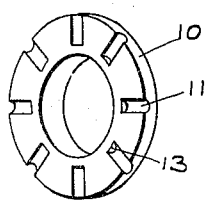

In the accompanying drawings, which are made a part of this application, Figure 1 is a side elevation of a wheel with parts of the felly broken away. Fig. 2 is an elevation of a fragment of the wheel with parts of the hub structure removed. Fig. 3 is a transverse sectional view through the wheel as seen on line 3—3 Fig. 1. Fig. 4 is a perspective view of one of the spokes removed from the wheel and Fig. 5 is a perspective view of one of the spoke locking plates.

Referring to the drawings, in which similar reference numerals designate corresponding parts throughout the several views, 1 indicates an axle which may be of any preferred construction, and such as is commonly used with coaster wagons, and 2 indicates a wheel hub which is hollow and has a flange 3 over one end through which an opening 4 is formed for the passage of the axle, while the opposite end of the hub is left open. Surrounding the axle 1 and within the hub 2 are a plurality of bearing rollers 5, which are held in position by means of retaining members 6 and in order to keep said bearing rollers properly lubricated, said hub, at substantially its longitudinal center, is provided with a rib 6′, in the inner face of which is formed a channel 7 for the reception of the lubricant, said channel extending entirely around the interior of the hub and having breakers 8 at intervals which cause the lubricant to flow on to the bearing rollers as the wheel rotates.

Integral with the exterior of the hub 2 and on opposite sides of the rib 6′ are peripheral flanges 9, the outer faces of which are preferably inclined outwardly, and coöperating with said flanges are locking plates 10, the inner faces of which are inclined similar to the inclined faces of the flanges 9, and said inner faces are provided at intervals with sockets 11 to receive the arms 12 of the wheel spokes, said sockets being likewise tapered so as to press the ends of the spoke arms against the inclined faces of the flanges 9. The sockets 11 extend less than the full depth of the locking plates 10 so as to leave shoulders 13 at their inner ends upon which the ends of the spoke arms rest.

Each spoke is preferably constructed of a rod or wire bent to substantially U shape, the integral portion 14 thereof connecting the arms 12 at their outer ends, and in order to provide a convenient means for connecting the spokes to the tire or rim 15 a channel shaped felly 16, which is substantially semicircular in cross section, is employed, and said felly is provided at intervals with openings 17 through which the arms 12 of the spokes project, each opening being of sufficient dimensions to permit the passage of two of the arms.

As the free ends of the spoke arms are separated, that is to say, one arm of one spoke positioned against the tapered face of one of the flanges 9 and the other end of the other arm of the same spoke engaged with the outer face of the opposite flange 9, and as the integral portion 14 of the spoke is located centrally between the separated ends of the spoke arms, said spoke arms extend outwardly at an angle from the integral portion and form braces against lateral movement, or end thrusts against the hub of the wheel, or against lateral twisting movement of the tire, and said arms are curved so that they will yield slightly under extreme stress and absorb any shock delivered against the tire or rim and assimilate such shock before it is transmitted to the hub of the wheel, and as the spokes are under tension, the resistance thereof will be directed in all directions. As best shown in Fig. 1 of the drawings, the integral portions 14 of the spoke members rest against the inner face of the tire or rim 15, and owing to the tension of the arms of the spokes said integral parts 14 will press against the inner face of the tire and thus form a continuous tread surface and prevent inward buckling or bending of the tire between the ends of the spoke arms, and by arranging the spokes in this manner the strain is entirely removed from the felly.

The inner end of the hub is covered with a cap 18 and the outer end thereof is covered with a cap 19 having openings 20, through which a cotter pin 21 may be introduced and entered through the end of the axle to hold the wheel on the axle, and if preferred a washer 22 may be introduced between the end of the hub and the cotter pin to protect the hub against contact with the cotter pin.

In assembling the parts of the wheel structure, the spoke arms are introduced through the opening 17, one arm of one spoke member and one arm of the next succeeding spoke member being projected through the same opening in the felly, one of said arms extending outwardly in one direction and the other arm in the opposite direction. The tire or rim 15 is then heated and disposed over the felly 16 and is shrunk thereon, or if desired the felly may be spot-welded or otherwise secured to the tire. The hub is then introduced between the flaring ends of the spoke arms so that said arms will project beyond the flanges 9, after which the locking plates 10 are placed against the outer faces of the spoke arms and the ends thereof entered in the sockets 11. Inward pressure is then directed against the locking plates and said plates forced on to the ends of the hub 2, said plates so fitting the hub as to hold the plates in position on the hub, or if preferred any suitable means may be employed for securely locking the plates in position on the projecting ends of the hub.

The bearing rollers 5 and the retaining members 6 are then assembled and introduced into the open end of the hub and the caps 18 and 19 then forced on to the ends of the hub, and preferably abutting against the locking plates 10, the washer 22 being placed in the cap 19 before it is placed on to the end of the hub. The wheel is now assembled ready for use, and in applying the same, the axle is introduced through the hub between the bearing rollers and through the washer at the outer end of the hub. The wheel is then rotated until one of the openings 20 is in registration with the opening through the end of the axle and a cotter pin is then introduced through one of the openings 20 and through the opening in the end of the axle, the lower end of the cotter pin being spread by introducing a tool through the other opening of the cap and separating the ends of the cotter pin.

By constructing the wheel in this manner all the parts thereof may be formed of metal, consequently a very strong and durable form of wheel is provided and one that is practically indestructible from use. Likewise the wheel will be comparatively light in weight and will be more or less resilient so as to absorb any shock that might be delivered against the tire of the wheel. Likewise the spokes as constructed will form practically a continuous tread surface, thus greatly reinforcing the tire at the points between the radially extending portions of the spoke members.

It will likewise be seen that by using the elastic spoke any contraction or expansion of the rim or tire will be compensated for without in any manner effecting any parts of the wheel structure. Should any contraction of the rim or tire occur the spokes will slightly yield in accordance with such construction, and when the rim or tire again expands the spokes will assume their natural position owing to the tension thereof, thus obviating any possibility of causing a distortion of any of the wheel parts due to expansion or contraction.

The invention claimed is:

1. A wheel construction, including a hub, a pair of flanges surrounding said hub and spaced from each other, the outer faces of said flanges being inclined outwardly to form overhanging edges, a plurality of substantially U shaped spokes having their ends resting against the overhanging faces of said flanges, locking plates having radial sockets therein for receiving the inner ends of said spokes, means for locking said plates in engagement with the hub and against the inclined faces of said flanges, and shoulders at the inner ends of said sockets upon which the ends of the spokes rest.

2. A wheel construction, including a hub, a plurality of substantially U shaped spokes coöperating therewith, and means for forcing said spokes in engagement with parts of said hub and imparting tension to the spokes.

3. A wheel construction, including a hub member, a plurality of substantially U shaped spoke members, plates for connecting the ends of the spoke members to the hub and a cap removably secured over each end of the hub and pressing against said plates for assisting in holding the plates against the ends of the spokes.

4. A wheel construction, including a hub, a pair of flanges integral with said hub and having their outer faces inclined, a plurality of spokes and locking plates having inclined sockets for receiving the ends of the spokes, the inner faces of said plates being inclined coincident to the inclination of said flanges, said plates locking the ends of the spokes in engagement with the flanges and holding the same in spaced relation and caps introduced over the ends of the hub and pressing against the plates for assisting in holding the plates in engagement with the spoke ends.

5. A wheel structure including a wheel rim, a hub member, a flange adjacent each end of the hub member, the outer faces of which are flat and inclined toward the ends of the hub, a plurality of substantially U-shaped spokes between said hub and rim, each comprising a pair of arms and an integral connecting portion at the outer ends of the arms, the free end of one spoke extending laterally in one direction and into engagement with the outer inclined face of one flange and the other arm extending laterally in the opposite direction and engaging the outer inclined face of the opposite flange, said connecting portion extending circumferentially of said rim and resting thereagainst; and locking plates having flat inclined inner faces adapted to clamp the inner ends of the spoke arms against the inclined faces of the flanges.

6. A wheel structure including a wheel rim, a hub member, a flange adjacent each end of the hub member, the outer faces of which are flat and inclined toward the ends of the hub, a plurality of substantially U-shaped spokes between said hub and rim each comprising a pair of arms and an integral connecting portion at the outer ends of the arms, the free end of one spoke extending laterally in one direction and into engagement with the outer inclined face of one flange and the other arm extending laterally in the opposite direction and engaging the outer inclined face of the opposite flange, said connecting portion extending circumferentially of said rim and resting thereagainst, the end of the connecting portion and the arm thereon abutting the connecting portion and arm of the next succeeding spoke member, said connecting portions forming a continuous bearing around the inner face of the rim, and locking plates having flat inclined inner faces adapted to clamp the inner ends of the spoke arms against the inclined faces of the flanges.

7. A wheel structure including a wheel rim, a hub member, a flange adjacent each end of the hub member the outer faces of which are flat and inclined toward the ends of the hub, a plurality of substantially U-shaped spokes between said hub and rim each comprising a pair of arms and an integral connecting portion at the outer ends of the arms, the free end of one spoke extending laterally in one direction and into engagement with the outer inclined face of one flange and the other arm extending laterally in the opposite direction and engaging the outer inclined face of the opposite flange, said connecting portion extending circumferentially of said rim and resting thereagainst, the end of the connecting portion and the arm thereon abutting the connecting portion and arm of the next succeeding spoke member, and locking plates having flat inclined inner faces adapted to clamp the inner ends of the spoke arms against the inclined faces of the flanges, the inner end of one abutting arm positioning at a point diametrically opposite the inner end of the adjacent abutting arm, said ends engaging different flanges.

8. A wheel structure including a wheel rim, a hub member, a flange adjacent each end of the hub member the outer faces of which are inclined and form overhanging portions, a plurality of substantially U-shaped spokes between the hub and rim, said spokes being outwardly bowed between their ends, the free ends of said spokes engaging the inclined faces of the flanges and projecting beneath the overhanging portions thereof, and means for pressing the free ends of the spokes against said flanges for holding said ends stationary.

In witness whereof, I have hereunto affixed my signature in the presence of the witnesses herein named.

WILLIAM R. WILSON.

Witnesses:
 ELIZABETH B. EVANS,
 MARIE R. HOLLAND.